(12) United States Patent
Hayashi et al.

(10) Patent No.: US 7,944,608 B2
(45) Date of Patent: May 17, 2011

(54) MICROSCOPE

(75) Inventors: Kazuhiro Hayashi, Akishima (JP);
Minoru Sukekawa, Hachioji (JP);
Takayuki Kono, Hachioji (JP)

(73) Assignee: Olympus Corporation, Tokyo (JP)

( * ) Notice: Subject to any disclaimer, the term of this patent is extended or adjusted under 35 U.S.C. 154(b) by 209 days.

(21) Appl. No.: 12/343,208

(22) Filed: Dec. 23, 2008

(65) Prior Publication Data

US 2009/0161209 A1 Jun. 25, 2009

(30) Foreign Application Priority Data

Dec. 25, 2007 (JP) ................................. 2007-332935

(51) Int. Cl.
*G02B 21/00* (2006.01)
(52) U.S. Cl. ........................................ 359/368; 359/227
(58) Field of Classification Search ........... 359/368–390
See application file for complete search history.

(56) References Cited

U.S. PATENT DOCUMENTS

| | | | |
|---|---|---|---|
| 4,407,569 A * | 10/1983 | Piller et al. | 359/370 |
| 5,481,393 A * | 1/1996 | Kashima et al. | 359/227 |
| 5,777,783 A | 7/1998 | Endou et al. | |
| 6,384,967 B1 * | 5/2002 | Watanabe et al. | 359/385 |
| 6,839,166 B2 * | 1/2005 | Fukushima et al. | 359/368 |

FOREIGN PATENT DOCUMENTS

JP 7-35986 A 2/1995

* cited by examiner

*Primary Examiner* — Thong Nguyen
(74) *Attorney, Agent, or Firm* — Holtz, Holtz, Goodman & Chick, PC (57) ABSTRACT

Provided are an illuminating optical system which illuminates a sample, an illumination-side pupil modulating device which is arranged on a side of the illuminating optical system, an illumination-side turret which holds the illumination-side pupil modulating device, an illumination-side-turret revolving mechanism which revolves the illumination-side turret to move the illumination-side pupil modulating device along an orbital circumference on a plane perpendicular to an optical axis, a relaying optical system which relays a pupil of an objective lens, an imaging-side pupil modulating device which is arranged on a side of the relaying optical system, an imaging-side turret which holds the imaging-side pupil modulating device, and an imaging-side-turret revolving mechanism which revolves the imaging-side turret to move the imaging-side pupil modulating device along the orbital circumference on a plane perpendicular to the optical axis.

4 Claims, 8 Drawing Sheets

MICROSCOPE

CROSS-REFERENCE TO RELATED APPLICATIONS

This application is based upon and claims the benefit of priority from Japanese Patent Application No. 2007-332935, filed Dec. 25, 2007, the entire contents of which are incorporated herein by reference.

BACKGROUND OF THE INVENTION

1. Field of the Invention

The present invention relates to a microscope which observes a sample with a pupil modulating device, for example, for phase-contrast observation, modulation-contrast observation, and differential-interference observation.

2. Description of the Related Art

Conventionally, a phase-contrast microscope and a differential interference microscope each have been known as a microscope for observing a transparent, colorless sample. Such a microscope uses a pupil modulating device to obtain an observed image with high contrast through optical diffraction and interference. For example, the phase-contrast microscope arranges as the pupil modulating device a ring slit at a conjugated position of a pupil of an objective lens, and a phase plate at the pupil of the objective lens, to observe a sample. The phase plate has a phase film which has a conjugated shape of a slit part of the ring slit, and which changes phase of direct light which is not diffracted by the sample. The phase-contrast microscope brings out contrast of the observed image by causing interference between the direct light and the diffracted light which is diffracted by the sample.

There has been disclosed a microscope which has a slider holding plural phase plates in the neighborhood of the position of pupil of the objective lens in Japanese Patent Application Laid-Open No. H7-035986. The slider of the microscope has plural openings, in which the phase plate is held in such a manner that the phase plate can be moved along a plane surface perpendicular to the optical axis. An observer slides the slider to arrange the phase plate appropriate for the objective lens in the neighborhood of the position of pupil, and operates the microscope to focus both the image of the slit and the image of the phase film at one point within the pupil of the objective lens. Specifically, the observer performs a centering operation by which the center of the slit and the center of the phase film are made overlapped with each other approximately at the center of the pupil of the objective lens.

SUMMARY OF THE INVENTION

A microscope according to an aspect of the present invention includes an illuminating optical system that illuminates a sample; an illumination-side pupil modulating device that is a pupil modulating device arranged on a side of the illuminating optical system opposing to a side of an objective lens; an illumination-side turret that holds the illumination-side pupil modulating device; an illumination-side-turret revolving mechanism that revolves the illumination-side turret to move the illumination-side pupil modulating device along a predetermined orbital circumference in a plane surface perpendicular to an optical axis; a relaying optical system that relays a pupil of the objective lens; an imaging-side pupil modulating device that is a pupil modulating device arranged on a side of the relaying optical system; an imagining-side turret that holds the imaging-side modulating device; and an imaging-side-turret revolving mechanism that revolves the imaging-side turret to move the imaging-side pupil modulating device along a predetermined orbital circumference on a plane surface perpendicular to the optical axis. The orbital circumference of the illumination-side pupil modulating device is substantially orthogonal to the orbital circumference of the imaging-side pupil modulating device within the pupil of the objective lens when viewed from a direction along the optical axis.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below. The present invention is not limited to the embodiments described. Same numerals are appended to identical components in the accompanying drawings.

Figure 1:
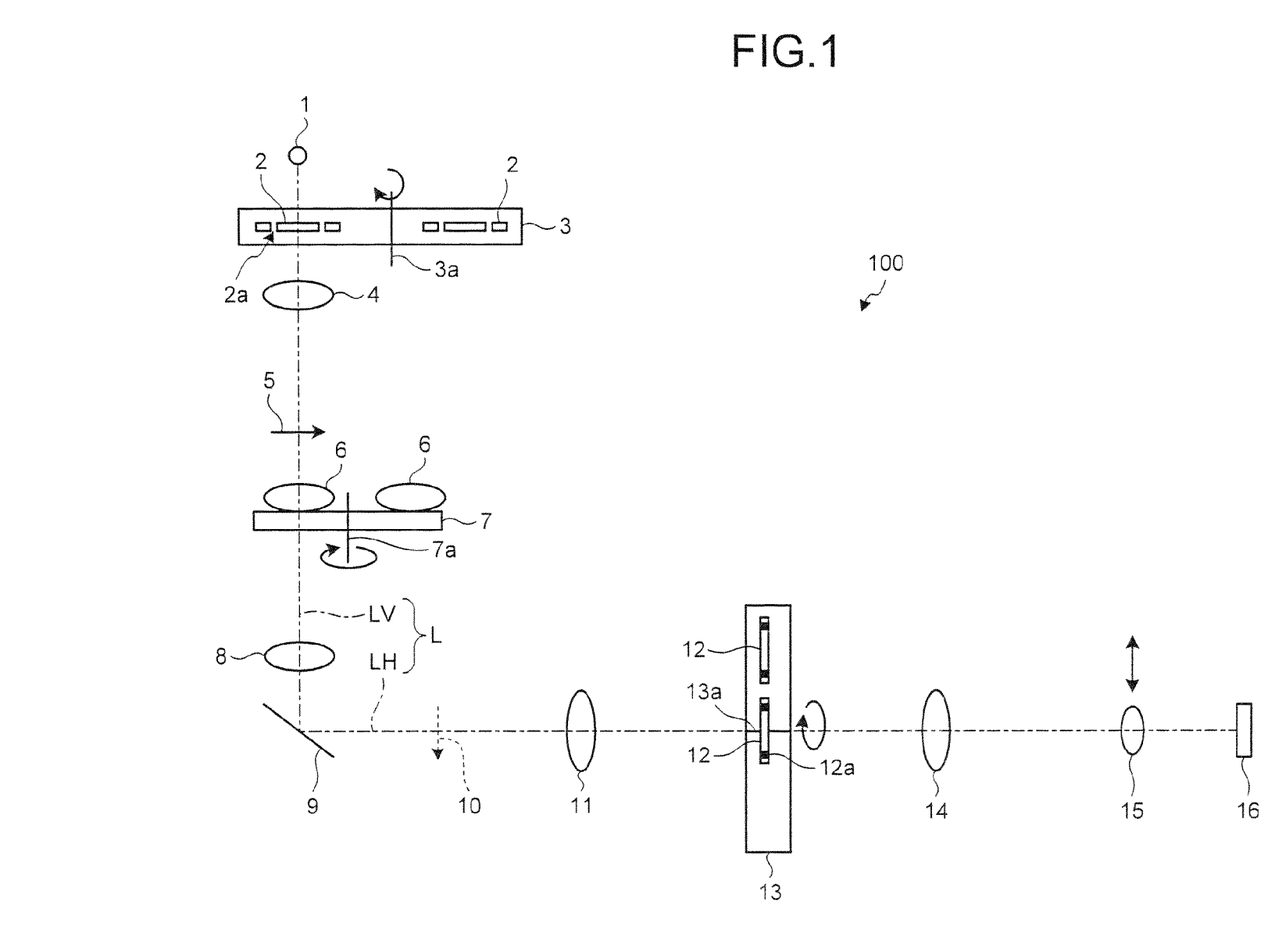
FIG. 1 shows an optical configuration of a microscope according to a first embodiment of the present invention.

FIG. 1 shows an optical configuration of a microscope 100 according to a first embodiment of the present invention. The microscope 100 is an inverted phase-contrast microscope. As shown in FIG. 1, the microscope 100 includes a light source 1, a condenser lens 4 serving as an illuminating optical system. A turret 3, the condenser lens 4, and a stage (not shown) on which a sample 5 is to be placed are arranged in an optical path of the illuminating light emitted from the light source 1.

The turret 3 includes a revolving mechanism which has a rotational axis 3a parallel to an optical axis LV as a central axis. The revolving mechanism can be manually rotated. The revolving mechanism holds plural ring slits 2, and moves the ring slits 2 along a predetermined orbital circumference on a plane surface perpendicular to the optical axis LV, to thereby arrange one of the ring slits 2 in the optical axis LV. The ring slit 2 arranged in the optical axis LV is projected, via the condenser lens 4, to a substantially conjugated position of a pupil of an objective lens 6.

The ring slit 2 is a pupil modulating device arranged on a side of the illuminating optical system. The ring slit 2 is a circular metallic plate having a doughnut slit 2a thereon, allows only the illuminating light toward the slit 2a to be transmitted and blocks rest of the illuminating light, which is directed toward other parts of the ring slit 2. Each of the ring slits 2 has a sit 2a of a size corresponding to a size of the pupil, i.e., to a magnification ratio of the objective lens 6. An inner circular plate and an outer plate of the slit 2a are connected with each other at a point not shown in the figure so that the inner circular plate of the slit 2a does not fall off.

The condenser lens 4 is arranged in such a manner that an optical axis of the condenser lens 4 is consistent with the optical axis LV, and thus focuses the illuminating light transmitted through the slit 2a on the sample 5.

The microscope 100 includes a revolver 7, an imaging lens 8, a mirror 9, a relaying lens 11, a turret 13, an image-capturing lens 14, an image-capturing device 16 in an optical path of observation light. An imaging optical system involves the objective lens 6, the imaging lens 8, the mirror 9, the relaying lens 11, a phase plate 12 held by the turret 13, the image-capturing lens 14, and the image-capturing device 16. A relaying optical system involves the imaging lens 8, and the relaying lens 11.

The revolver 7 can be manually revolved around a rotational axis 7a being a central axis. The revolver 7 holds plural objective lenses 6, and arranges one of the objective lens 6 in the optical path. The imaging lens 8 focuses the observation light transmitted through the objective lens 6, and forms an image of the sample 5 on a first-imaging position 10. The objective lens 6 and the imaging lens 8 are arranged such that their optical axes are consistent with the optical axis LV.

The mirror 9 is arranged between the imaging lens 8 and the first-imaging position 10. The mirror 9 reflects the observation light to thereby bend the optical path of the observation light so that the optical axis LV and an optical axis LH are connected with each other. The optical axes LV, LH put together are referred to as an optical axis L. When the mirror 9 is not provided, each of the optical devices is arranged to make the optical axes LV, LH consistent with each other.

The relaying optical system relays the pupil of the objective lens 6. The turret 13 includes a revolving mechanism which has a rotational axis 13a arranged on a front side of the figure as a central axis. The revolving mechanism can be manually revolved. The revolving mechanism has plural phase plates 12, and moves the phase plates 12 along a predetermined orbital circumference on a plane surface perpendicular to the optical axis LH to thereby arrange one of the phase plates 12 in the optical axis LH. A position where the phase plate 12 is arranged to be in the optical path LH is substantially overlapped with the position of the pupil of the objective lens 6 which is relayed by the relaying optical system.

The phase plate 12 is a pupil modulating device arranged on a side of the imaging optical system, has a doughnut-shaped phase film 12a evaporated thereon. The phase film 12a is formed of a one-fourth wavelength plate which shifts a wavelength of incident light by one-fourth, and an absorption film which absorbs the incident light. The phase film 12a shifts phase of the observation light transmitting through the phase film 12a by a one-fourth wavelength, and lowers luminance of the observation light. Each of the phase plates 12 has the phase film 12a of a size appropriate for the size of the pupil, i.e., the magnification ratio of the objective lens 6. When the objective lens 6 for the observation is switched, the observer arranges the ring slit 2 and the phase plate 12 which are appropriate for the switched objective lens 6 in the optical axis L, performs the centering operation, and performs the phase-contrast observation. When the image of the slit 2a and the image of the phase film 12a appropriate for the objective lens 6 are viewed from the conjugated position of the pupil of the objective lens 6, the image of the phase film 12a is observed as being wider than the image of the slit 2a.

The image-capturing lens 14 focuses the observation light transmitted through the phase plate 12 to form the image of the sample 5 on the image-capturing device 16. The relaying lens 11 and the image-capturing lens 14 are arranged in such a manner that their optical axes are consistent with the optical axis LH.

The image-capturing device 16 is realized by a CCD or the like. The image-capturing device 16 converts the incident light into an electric signal to capture the projected image. The image-capturing device 16 may be replaced by an ocular lens. In this case, the observer can observe the image via the ocular lens without using a monitor or the like.

As shown in FIG. 1, the observation light transmits through the objective lens 6 and the imaging lens 8 to be deflected by the mirror 9, and then transmits through the relaying lens 11 and the phase plate 12 to enter the image-capturing lens 14 to thereby form the image of the sample 5 back on the image-capturing device 16.

A pupil-imaging lens 15 is detachably arranged between the image-capturing lens 14 and the image-capturing device 16. When the pupil-imaging lens 15 is arranged in the optical axis LH, the image of the pupil of the objective lens 6, the image of the slit 2a, and the image of the phase film 12a are formed on the image-capturing device 16. The observer arranges the pupil-imaging lens 15 in the optical axis LH, and observes the image of the slit 2a and the phase film 12a formed on the image-capturing device 16 by referring to the monitor (not shown) or the like, and performs the centering operation. Specifically, in the centering operation, the observer first revolves the turret 3 to make the center of the image of the slit 2a overlapped with the center of the pupil of the objective lens 6, and then revolves the turret 13 to make the image of the phase film 12a overlapped with the image of the slit 2a.

Figure 2:
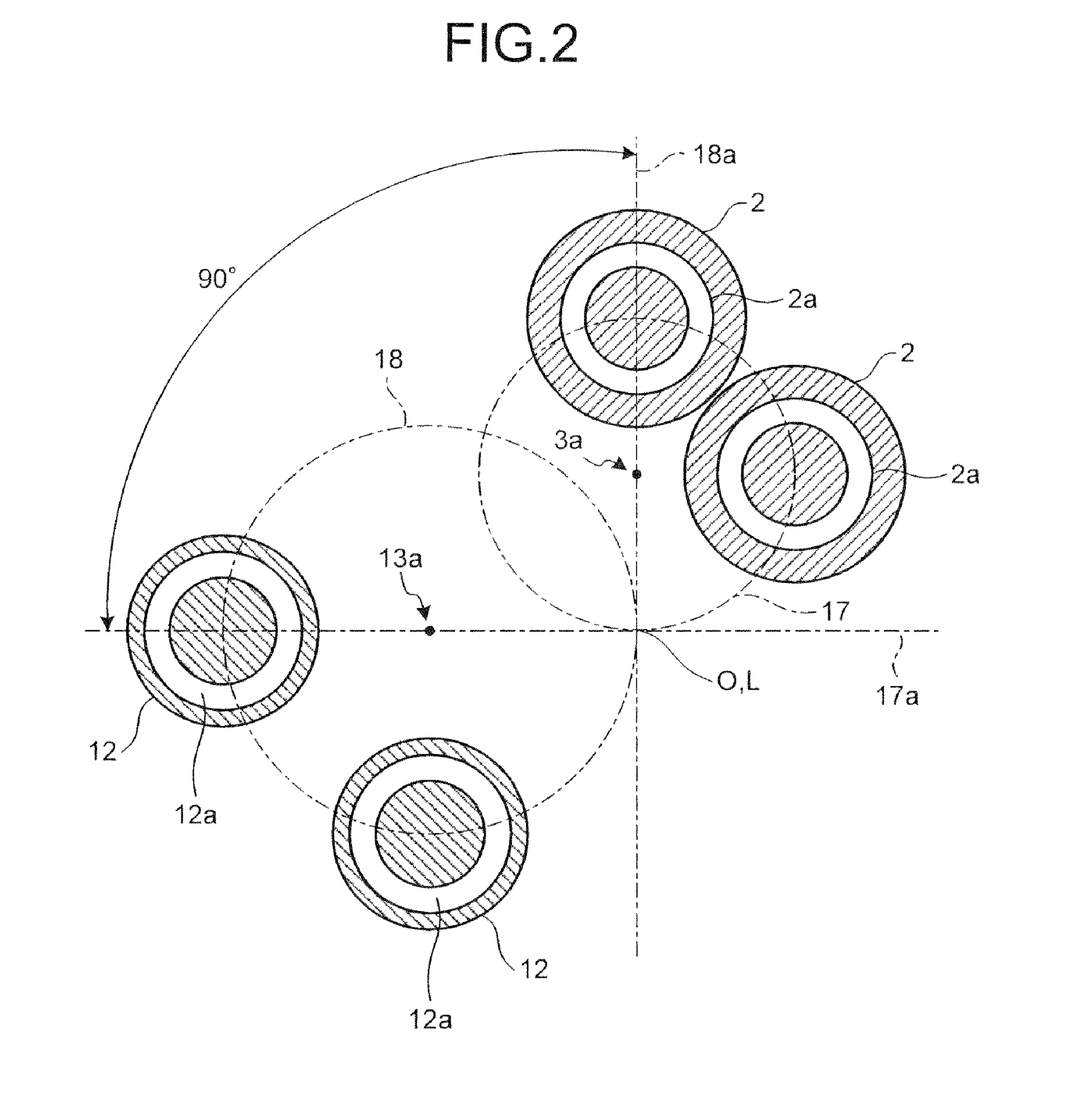
FIG. 2 shows orbital circumferences of a center of a slit, and a center of a phase film viewed from a direction along an optical axis.

The movement of the ring slit 2 and the phase plate 12 when the turrets 3, 13 are revolved is described. FIG. 2 shows an orbital circumference 17, i.e., a movement trajectory of the center of the slit 2a when viewed from a direction along an optical axis L, and an orbital circumference 18, i.e., a movement trajectory of the center of the phase film 12a. The orbital circumference 17 is a circle having the rotational axis 3a at center, and the orbital circumference 18 is a circle having the rotational axis 13a at center. The ring slit 2 moves along the orbital circumference 17 as the turret 3 revolves, and the phase plate 12 moves along the orbital circumference 18 as the turret 13 revolves.

As shown in FIG. 2, when viewed from the direction along the optical axis L, a tangent 17a of the orbital circumference 17 and a tangent 18a of the orbital circumference 18 are substantially orthogonal to each other in the optical axis L. Thus, the orbital circumferences 17 and 18 are substantially perpendicular to each other in the optical axis L. Since the objective lens 6 is arranged to make a center O of the pupil of the objective lens 6 consistent with the optical axis L, the center O of the pupil of the objective lens 6, and an intersection of the orbital circumferences 17 and 18 are overlapped with each other in the optical axis L when viewed from the direction along the optical axis L. Thus, the center O of the pupil of the objective lens 6 is substantially overlapped with a point where the center of the slit 2a and the center of the phase film 12a are overlapped with each other. When the image of the slit 2a and the image of the phase film 12a are overlapped, the center O of the pupil of the objective lens 6, the center of the slit 2a, and the center of the phase film 12a are overlapped, whereby the phase-contrast observation can be performed.

Figure 3:
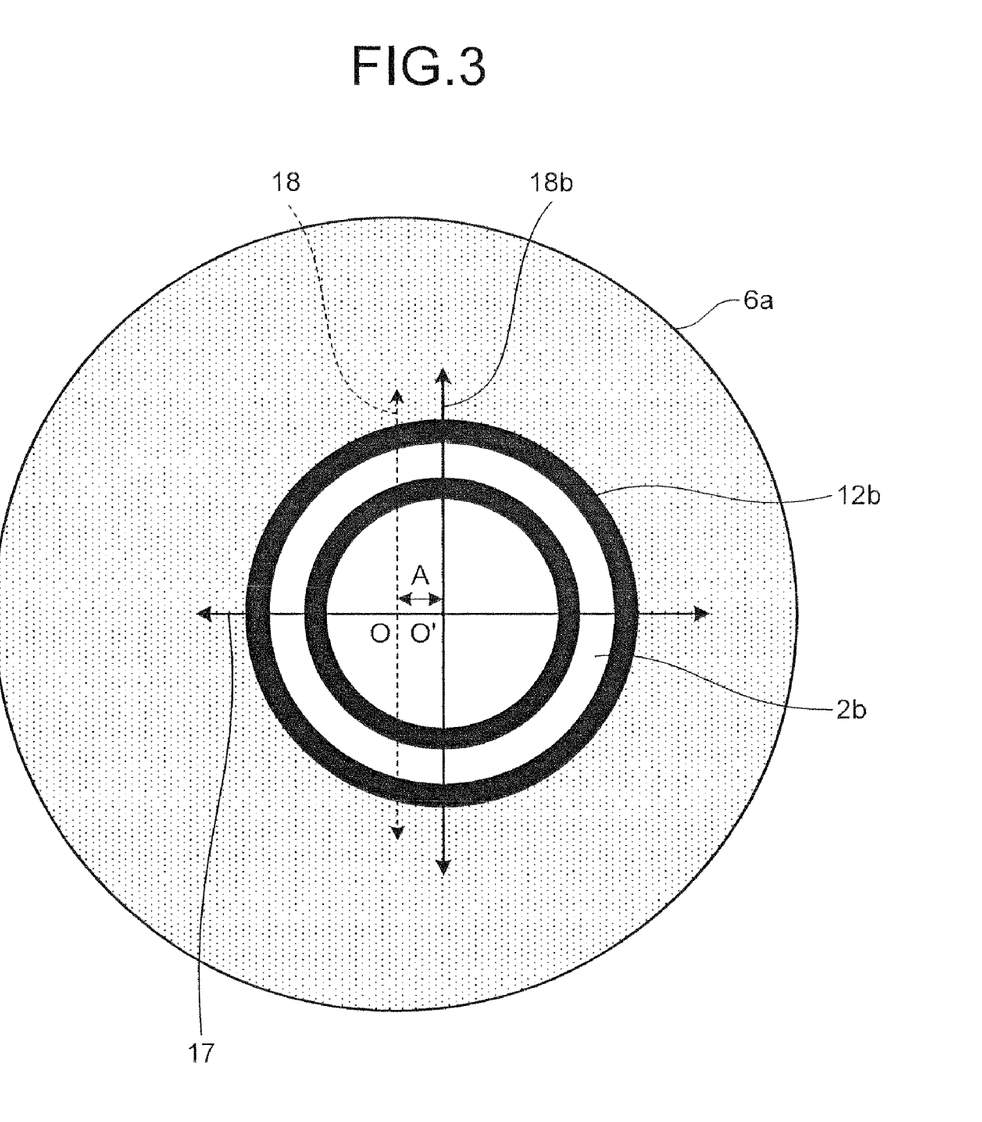
FIG. 3 shows images of a slit and a phase film within a pupil of an objective lens.

The orbital circumferences 17 and 18 may be deviated within the plane surface perpendicular to the optical axis L due to the deviation of the rotational axes 3a and 13a, or the deviation of the fixation points of ring slit 2 and the phase plate 12 on the turrets 3 and 13. FIG. 3 shows an image where an image 2b of the slit 2a and an image 12b of the phase film 12a within a pupil 6a of the objective lens 6 when the phase plate 12 is moved along an orbital circumference 18b which is translated by A from the orbital circumference 18. In this case, a center of the image 2b and a center of the image 12b are overlapped at an intersection O' which is distant by A from the center O of the pupil 6a.

Figure 4:
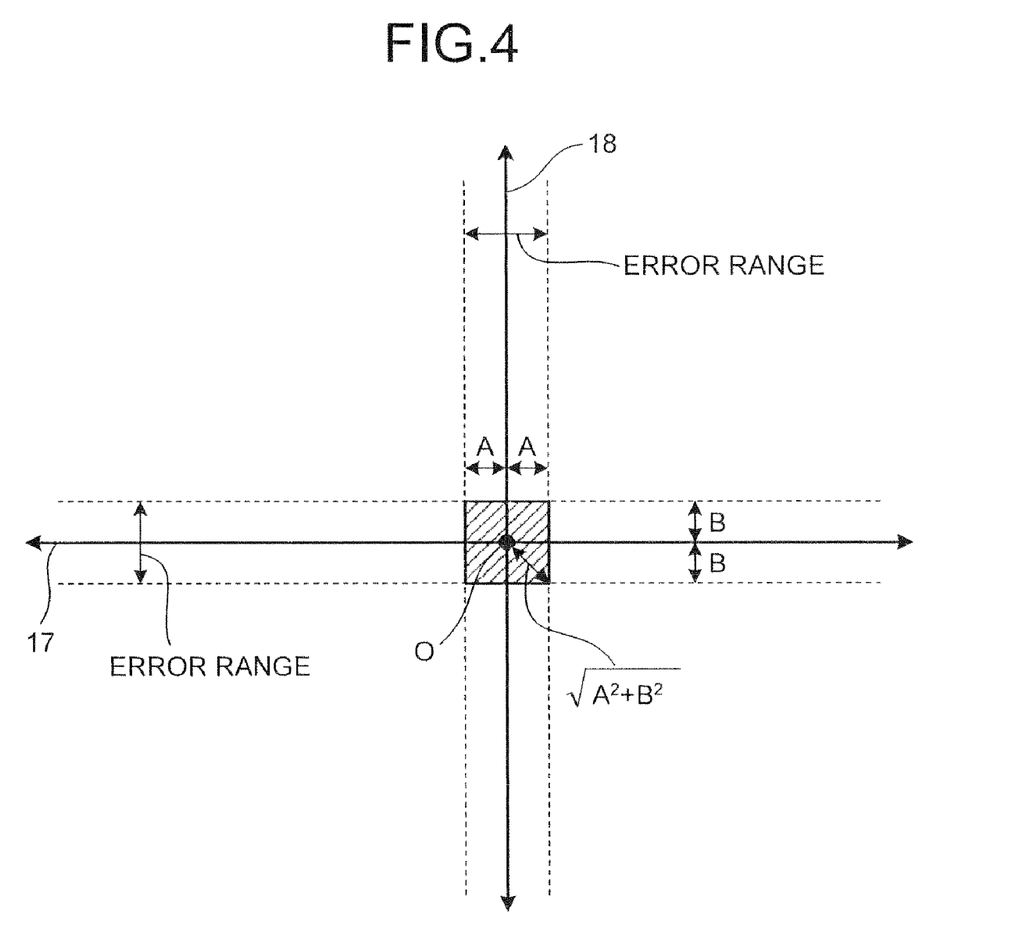
FIG. 4 shows orbital circumferences of the center of slit and the center of the phase film around a center of the pupil of the objective lens.

FIG. 4 shows an enlarged view of the orbital circumferences 17 and 18 around the center O when viewed from the direction along the optical axis L. As shown in FIG. 4, an error range of the orbital circumference 17 is referred to as a range of distance B on the plane surface including the optical axis L, and an error range of the orbital circumference 18 is referred to as a range of distance A on the plane surface including the optical axis L. In this case, the intersection of the orbital circumferences 17, 18 is within a rectangular (shaded area in the figure) having an area 2A×2B and a center O where the error ranges of the orbital circumferences 17 and 18 are overlapped. In this case, the point where the center of the image 2b and the center of the image 12b are overlapped can be distant from the center O by up to $\sqrt{A^2+B^2}$.

When the deviation of the point where the center of the image 2b and the center of the image 12b are overlapped from the center O is less than or equal to 0.1% of a diameter of the pupil of the objective lens 6, the phase-contrast observation is not affected by the deviation. Thus, the microscope 100 is configured such that the error ranges of the orbital circumferences 17, 18, i.e., $\sqrt{A^2+B^2}$ is less than or equal to 0.1% of the diameter of the pupil of the objective lens.

Figure 5:
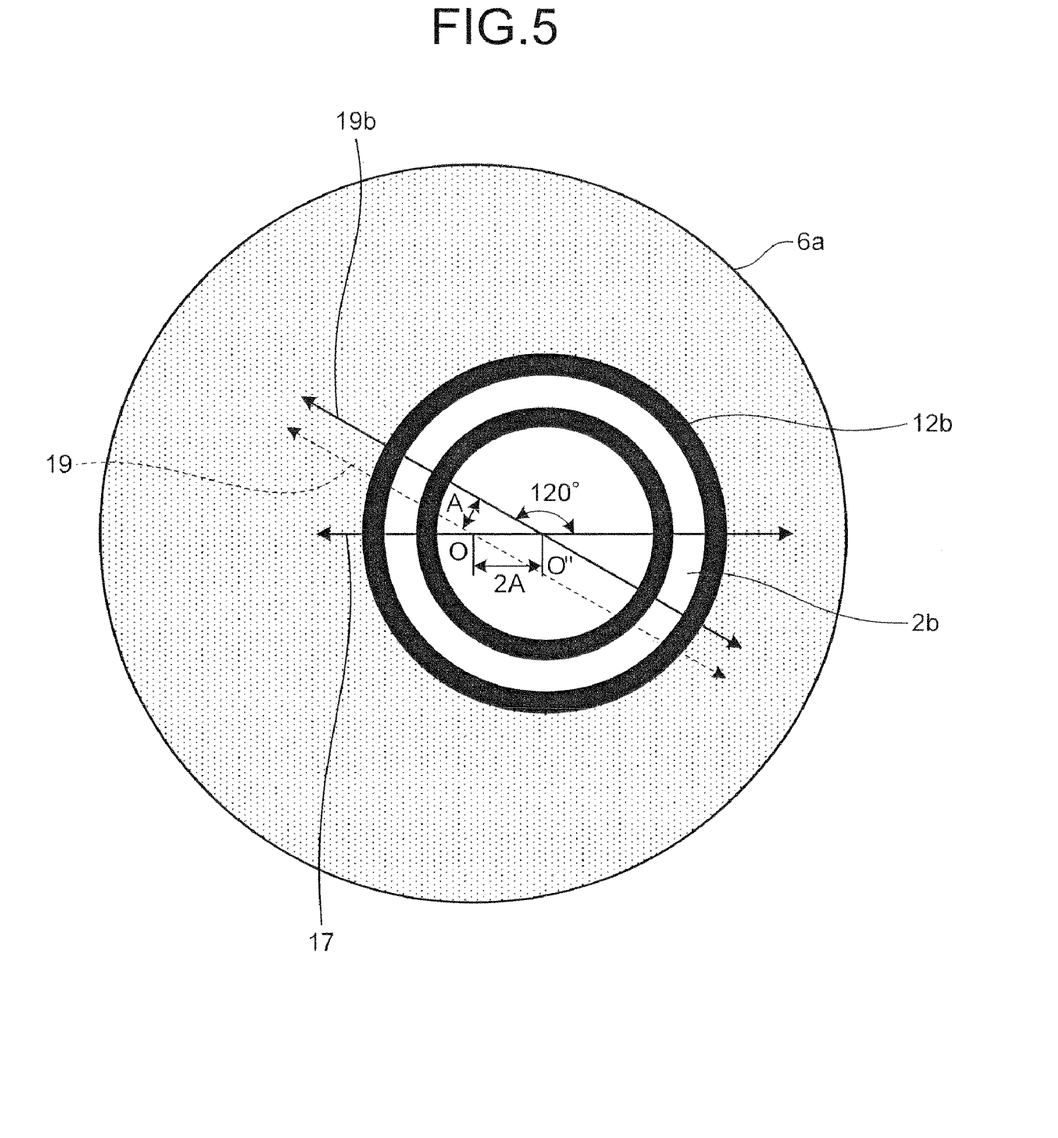
FIG. 5 shows images of the slit and the phase film within the pupil of the objective lens in case of a microscope in which the orbital circumference of the center of the slit is not perpendicular to the orbital circumference of the center of the phase film.

As the angle made by the orbital circumferences of the ring slit 2 and the phase plate 12 deviates from 90 degrees, the error of the orbital circumferences causes more deviation between the center O and the point where the center of the image 2b and the center of the image 12b are overlapped. Suppose, for example, the center of the phase film 12a moves along an orbital circumference 19 which makes 120 degrees to the orbital circumference 17 at the intersection thereof. FIG. 5 shows an image where the image 2b and the image 12b are overlapped within the pupil 6a when the phase plate 12 moves along the orbital circumference 19b which is translated by A from the orbital circumference 19. In the case shown in FIG. 5, the center of the image 2b and the center of the image 12b are overlapped at an intersection O'' which is distant by 2A from the center O. Even when the orbital circumferences 18, 19 are translated by A, the deviation between the center O and the center O'' is larger than that between the center O and the center O'.

Figure 6:
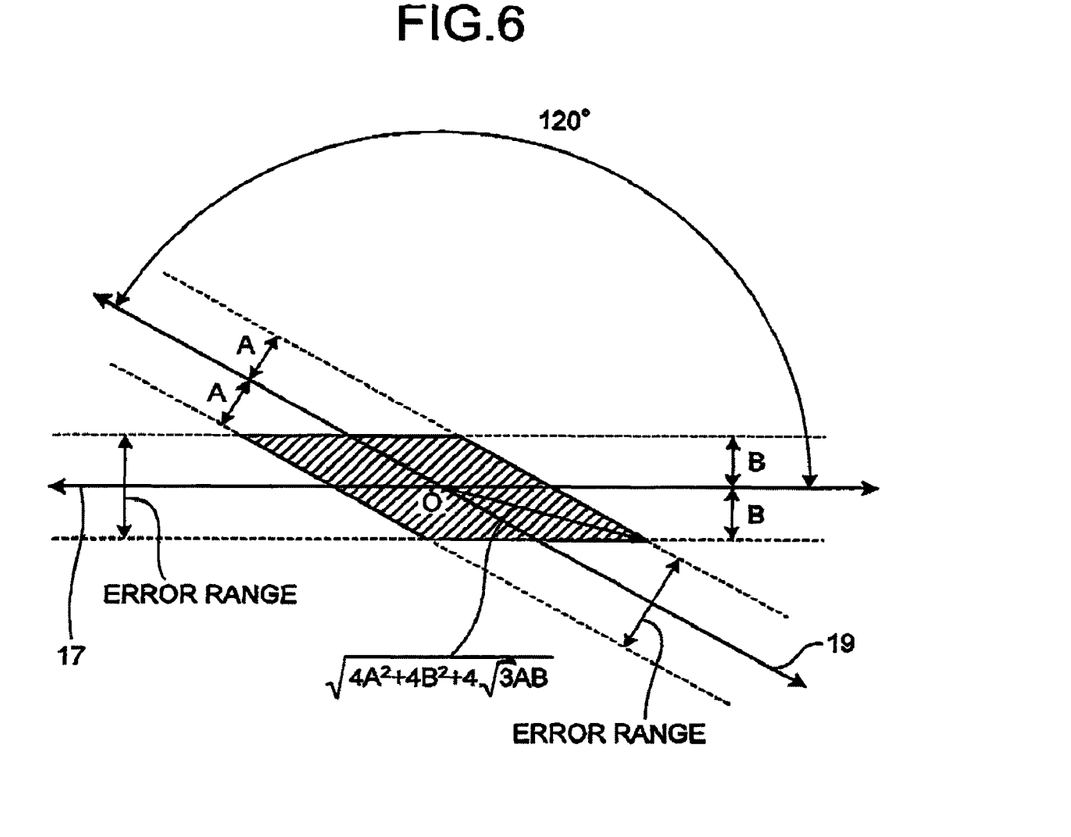
FIG. 6 shows the orbital circumference of the center of the slit and that of the center of the phase film around the center of the pupil of the objective lens in the microscope shown in FIG. 5.

FIG. 6 shows an enlarged view of the orbital circumferences 17, 19 around the center O when viewed from the direction along the optical axis L. When the error range of the orbital circumference 19 is supposed as being within the distance A on the plane surface including the optical axis L similarly to the error range of the orbital circumference 18, the intersection of the orbital circumferences 17 and 19 is within a parallelogram (shaded area in the figure) having the center O where the error ranges of the orbital circumferences 17 and 19 are overlapped. In this case, the point where the center of the image 2b and the center of the image 12b are overlapped can be distant by up to $\sqrt{4A^2+4B^2+4\sqrt{3}AB}$. Thus, when the error ranges of the orbital circumferences 17 and 19 are set similarly to the orbital circumferences 17 and 18, the point where the center of the ring slit 2 and the center of the phase plate 12 are overlapped deviates much from the center O of the pupil 6a, possibly resulting in the phase-contrast observation with which the sample cannot be observed properly. When the orbital circumference of the ring slit 2 and the orbital circumference of the phase plate 12 are not orthogonal to each other, the acceptable error range becomes smaller compared with the case where the orbital circumferences are orthogonal to each other. Hence, the microscope 100 is configured such that the orbital circumference of the ring slit 2 and the orbital circumference of the phase plate 12 are orthogonal to each other. "Orthogonal" as used herein is intended to encompass a range of about 90°+20°, and as long as the error range is within the range, the advantage of the present invention can be provided.

Further, a condition that the orbital circumferences of the ring list 2 and the phase plate 12 are linearly arranged within the pupil 6a can be described as below: "r1" represents a radius of the orbital circumference of the ring slit 2; 'r2' represents a radius of the orbital circumference of the phase plate 12; and "D" represents an observed diameter of the pupil 6a.

r1>D r2>D

According to the microscope 100 according to the first embodiment, the observer can perform the centering operation only by revolving the turrets 3, 13, resulting in the easy and handy centering operation. Further, according to the microscope 100, the phase-contrast observation can be performed using an objective lens for observing a bright field instead of using the objective lens for observing the phase contrast which has the phase film. Further, with objective lenses having pupils at a same position, and having different magnification ratios such as four times, ten times, and forty times, the microscope 100 can perform the phase-contrast observation by changing the magnification ratio without moving the imaging lens 8.

Further, the microscope 100 may be configured with a mechanical click locking mechanism or the like which stores rotational angles of the turrets 3 and 13 in performing the centering operation so that the state of the microscope for performing the centering operation can be easily reconstructed.

In the first embodiment, the turrets 3 and 13 are revolved manually to arrange the ring list 2 and the phase plate 12 which are appropriate for the objective lens 6 in the optical axis L. In a second embodiment, however, a control unit automatically arranges the ring slit 2 and the phase plate 12 in the optical axis L.

Figure 7:
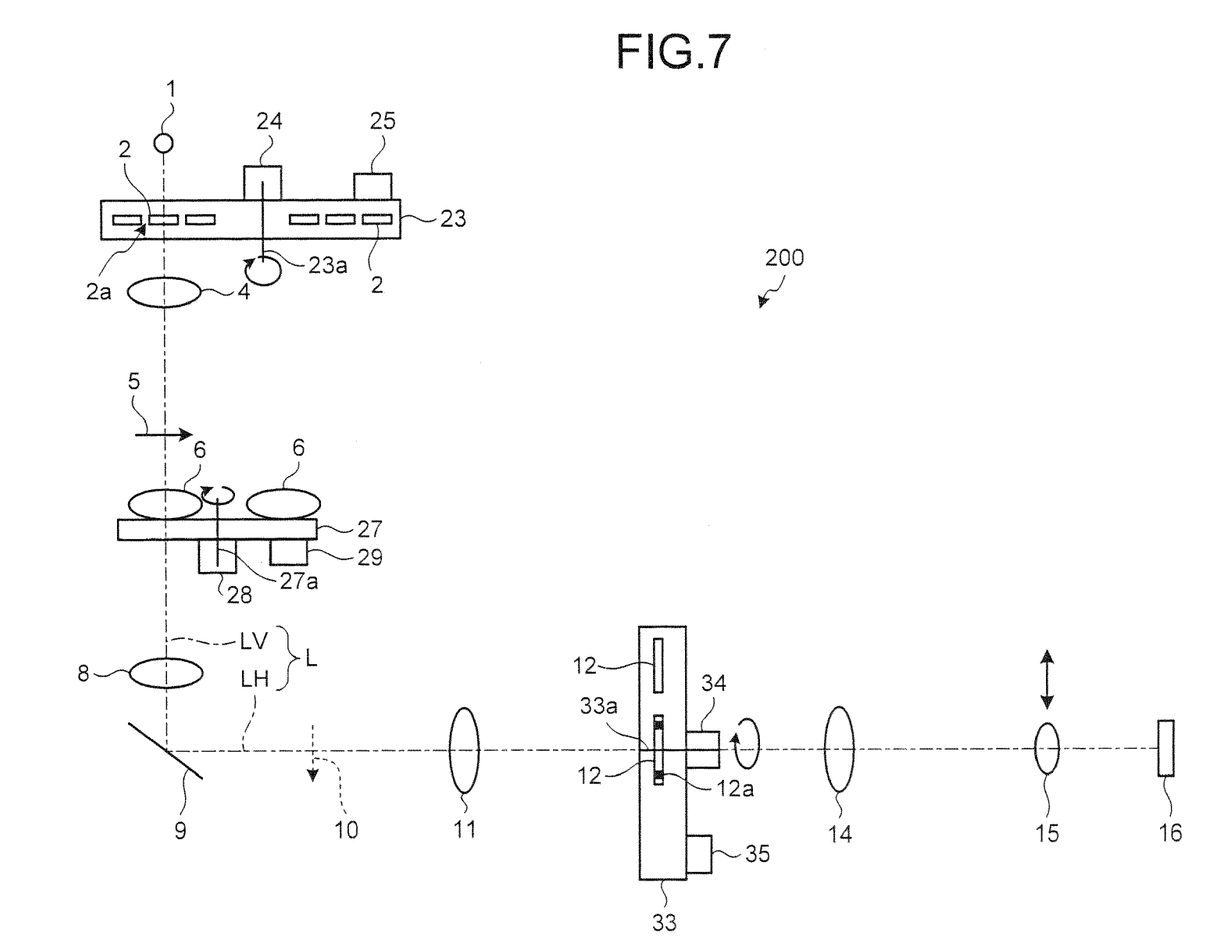
FIG. 7 shows an optical configuration of a microscope according to a second embodiment of the present invention.

FIG. 7 shows an optical configuration of a microscope 200 according to the second embodiment. The microscope 200 is an inverted phase-contrast microscope similarly to the microscope 100. As shown in FIG. 7, the microscope 200 includes a turret 23, a revolver 27, and a turret 33 instead of the turret 3, the revolver 7, and the turret 13 included in the microscope 100. Other optical configurations of the microscope 200 are identical with those of the microscope 100.

The turret 23 includes a motor 24 and a sensor 25. The turret 23 can be revolved around a rotational axis 23a being a central axis by driving the motor 24. Similarly to the turret 3, the turret 23 holds plural ring slits 2, and moves the ring slits 2 along the orbital circumference 17 to thereby arrange one of the ring slits 2 in the optical axis L. The motor 24 is realized by a step motor or the like. The sensor 25 is realized, for example, by a transmissive photo-implanter or the like which detects a predetermined original point of the turret 23.

The revolver 27 includes a motor 28 and a sensor 29. The revolver 27 can be revolved around a rotational axis 27a being a central axis by driving the motor 28. Similarly to the revolver 7, the revolver 27 holds plural objective lenses 6, and arranges one of the objective lenses 6 in the optical axis L. The motor 28 is realized by a step motor or the like. The sensor 29 is realized by a transmissive photo-implanter or the like which detects a predetermined original point of the revolver 27.

The turret 33 includes a motor 34 and a sensor 35. The turret 33 can be revolved around a rotational axis 33a being a central axis which is present on a front side of the figure by driving the motor 34. Similarly to the turret 13, the turret 33 holds plural phase plates 12, and moves the phase plates 12 along the orbital circumference 18 to thereby arrange one of the phase plates 12 in the optical axis L. The motor 34 is realized by a step motor or the like. The sensor 35 is realized by a transmissive photo-implanter or the like which detects a predetermined original point of the turret 33

Figure 8:
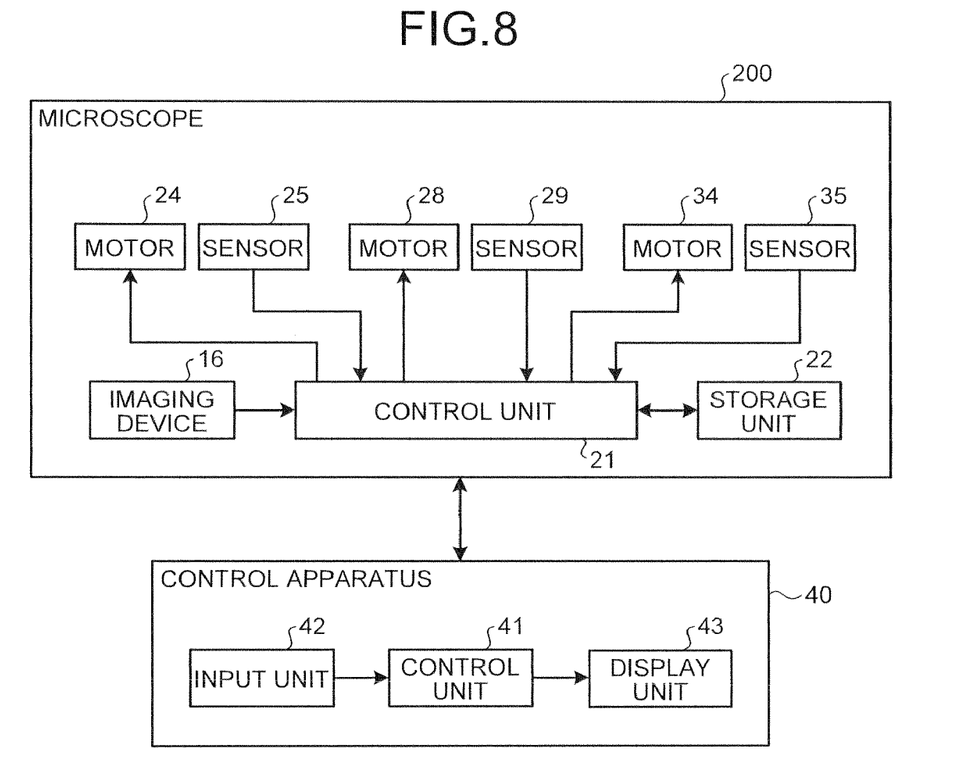
FIG. 8 shows a schematic configuration of a control mechanism of the microscope shown in FIG. 7.

FIG. 8 shows a schematic configuration of a control mechanism of the microscope 200. The microscope 200 includes a control unit 21. The control unit 21 controls the driving of the motors 24, 28 and 34, and receives input of the detection signals indicating that the original point is detected from the sensors 25, 29 and 35. The control unit 21 includes a storage unit 22, and stores a variety of information such as positional relations between the original point and each of the objective lenses 6 in the storage unit 22. Based on the detection signals about the original point, which are input from the sensors 25, 29, and 35 and on a number of pulses input into the motors 24, 28, and 34, the control unit 21 obtains information of the positional relations between the optical axis L and each of the ring slits 2, between the optical axis L and each of the objective lenses 6, and between the optical axis L, and each of the phase plates 12. The control unit 21 is electrically connected with the image-capturing device 16, and receives input of electric signals of the image formed on the image-capturing device 16.

Further, the control unit 21 is electrically connected with a control apparatus 40. The control apparatus 40 is realized by a personal computer or the like, and includes a control unit 41, an input unit 42, and a display unit 43. The control unit 41 controls operations of the control unit 21 and the display unit 43 based on a variety of information input from the control unit 21 and the input unit 42. The input unit 42 is realized by a keyboard, a mouse, or the like. The input unit 42 inputs a variety of information input from the observer into the control unit 41. The display unit 43 is realized by a liquid crystal display or the like. The display unit 43 displays thereon a variety of information such as the image formed on the image-capturing device 16 under the control by the control unit 41.

Processes of the control unit 21 and the control unit 41 are described below. When the control unit 41 receives input of information which specifies a desired objective lens 6, e.g. information of the magnification ratio from an observer, the control unit 41 inputs the input information into the control unit 21. Based on the received input information, the control unit 21 controls the motors 24, 28, and 34 to arrange the objective lens 6 desired by the user, and the ring slit 2 and the phase plate 12 appropriate for the objective lens 6 in the optical axis L.

Previously to the phase-contrast observation, the observer arranges the pupil-imaging lens 15 in the optical axis L, and performs the centering operation so that the display unit 43 displays the pupil 6a of the objective lens, the image 2b of the ring slit, and the image 12b of the phase plate as being overlapped with each other. When the centering operation is performed, the control unit 21 stores in the storage unit 22 the number of pulses input into the motors 24 and 34 for revolving the turrets 23 and 33 at the original position until the center of the image 2b and the center of the image 12b are overlapped. When the control unit 21 arranges the ring slit 2 and the phase plate 12 in the optical axis L, the control unit 21 inputs the number of pulses stored in the storage unit 22 into the motors 24 and 34 to thereby reconstruct the state where the centering operation is previously performed.

In the microscope 200 according to the second embodiment, the control unit 21 controls the driving of motors 24, 28, and 34 based on the instruction from the observer. The microscope 200 can arrange the objective lens 6 desired by the observer in the optical axis, and arranges the rings slit 2 and the phase plate 12 appropriate for the objective lens, which is arranged in the optical axis L, in the optical axis, so that the center of the image 2b of the ring slit and the center of the image 12b of the phase plate are automatically overlapped around the center O. Thus, the observer can perform the easy and handy phase-contrast observation.

When the motors 24, 28, and 34 are realized by step motors, the control unit 21 can reconstruct the state where the centering operation is previously performed based on the number of pulses input into the motors 24, 28, and 34. In this case, the microscope 200 does not require a mechanical stopping apparatus which for example is controlled by clicking, whereby abrasion of the stopping apparatus, and burden on stopping the microscope 200 are reduced, resulting in better durability of the electrical mechanisms such as the motors 24, 28, and 34.

In the first embodiment and the second embodiment, the phase-contrast microscope is described as an example of the microscope according to the present invention. The microscope according to the present invention, however, is not limited to the phase-contrast microscope. The present invention can be also applied to microscopes for modulation-contrast observation, and differential-interference observation. Thus, the pupil modulating device is not limited to the ring slit and the phase plate, and a light polarizer or other polarizers may be used. Space of the turret 3 arranged in the optical path of the illuminating light and of the turret 13 arranged in the optical path of the observation light may be occupied, for example, by a filter or the like such as a fluorescent cube and a wavelength selecting filter which does not require the centering operation.

In the microscope according to the embodiments, the orbital circumference of the illumination-side pupil modulating device and the orbital circumference of the imaging-side pupil modulating device are orthogonal to each other when viewed from the direction along the optical axis. Thus, when one of or both orbital circumferences include errors, the deviation of the intersection of the orbital circumference of the illumination-side pupil modulating device and the orbital circumference of the imaging-side modulating device can be suppressed and minimized. Hence, the present invention can provide advantage of the handy microscope with which the centering operation can be performed only by revolving the imaging-side turret and the illumination-side turret.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:

an illuminating optical system that illuminates a sample;

an illumination-side pupil modulating device that is arranged on a side of the illuminating optical system opposing to a side of an objective lens;

an illumination-side turret that holds the illumination-side pupil modulating device;

an illumination-side-turret revolving mechanism that revolves the illumination-side turret to move the illumination-side pupil modulating device along a predetermined orbital circumference in a plane surface perpendicular to an optical axis;

a relaying optical system that relays a pupil of the objective lens;

an imaging-side pupil modulating device that is arranged on a side of the relaying optical system;

an imaging-side turret that holds the imaging-side pupil modulating device; and an imaging-side-turret revolving mechanism that revolves the imaging-side turret to move the imaging-side pupil modulating device along a predetermined orbital circumference on a plane surface perpendicular to the optical axis, wherein when the orbital circumference of the illumination-side pupil modulating device and the orbital circumference of the imaging-side pupil modulating device are projected on planes perpendicular to the optical axis along the optical axis, and when viewing from a direction along the optical axis, at an intersection point of the orbital circumferences, a tangent line of the orbital circumference of the illumination-side pupil modulating device and a tangent line of the orbital circumference of the imaging-side pupil modulating device are substantially perpendicular to each other.

2. The microscope according to claim 1, further comprising:

a revolver that selects the objective lens from a plurality of objective lenses held therein;

a revolver driving unit that drives the revolver; and a control unit that controls driving of the revolver driving unit, the illumination-side-turret revolving mechanism, and the imaging-side-turret revolving mechanism, and that arranges on the optical axis, the illumination-side pupil modulating device and the imaging-side pupil modulating device which are appropriate for the objective lens arranged on the optical axis, so that a center of the illumination-side pupil modulating device and a center of the imaging-side pupil modulating device are made overlapped with each other within the pupil of the objective lens when viewed from the direction along the optical axis.

3. The microscope according to claim 1, wherein:

the imaging-side pupil modulating device is arranged substantially at a position of the pupil of the objective lens, and the illumination-side pupil modulating device is arranged substantially at a conjugated position of the position of the pupil of the objective lens.

4. The microscope according to claim 1, wherein the imaging-side turret is adapted to hold a wavelength selecting filter.

* * * * *